United States Patent
Lin et al.

(10) Patent No.: US 8,370,965 B2
(45) Date of Patent: Feb. 12, 2013

(54) DETACHABLE SOLAR THERMAL COAT ASSEMBLY WITH CARBON NANOCAPSULE COMPOSITE MATERIAL

(76) Inventors: Liang-Yang Lin, Taipei (TW); Hong-Wen Wang, Taipei (TW)

( * ) Notice: Subject to any disclaimer, the term of this patent is extended or adjusted under 35 U.S.C. 154(b) by 277 days.

(21) Appl. No.: 12/794,783

(22) Filed: Jun. 7, 2010

(65) Prior Publication Data
US 2011/0030120 A1   Feb. 10, 2011

(30) Foreign Application Priority Data
Aug. 6, 2009   (TW) .............................. 98214594 U

(51) Int. Cl.
*A41D 1/00* (2006.01)
*A41D 3/02* (2006.01)

(52) U.S. Cl. ..................................................... 2/97; 2/93
(58) Field of Classification Search .................. 2/81, 85, 2/97, 94, 101, 93, 108, 102, 115
See application file for complete search history.

(56) References Cited

U.S. PATENT DOCUMENTS

| | | | | |
|---|---|---|---|---|
| 2,976,539 A * | 3/1961 | Brown, Jr. | ............................. | 2/93 |
| 3,079,486 A * | 2/1963 | Winchell | ....................... | 219/528 |
| 3,084,241 A * | 4/1963 | Carrona | ........................ | 219/211 |
| 4,484,362 A * | 11/1984 | Asher | ................................. | 2/69 |
| 4,525,406 A * | 6/1985 | Pollock | ......................... | 428/137 |
| 4,539,714 A * | 9/1985 | Fratti | ................................. | 2/108 |
| 4,696,066 A * | 9/1987 | Ball et al. | .......................... | 2/272 |
| 4,716,598 A * | 1/1988 | Bertram | .............................. | 2/108 |
| 4,856,294 A * | 8/1989 | Scaringe et al. | ............. | 62/259.3 |
| 5,072,455 A * | 12/1991 | St. Ours | ............................... | 2/81 |
| 5,148,002 A * | 9/1992 | Kuo et al. | ...................... | 219/211 |
| 5,227,230 A * | 7/1993 | McGlade | ................... | 428/319.1 |
| 5,243,706 A * | 9/1993 | Frim et al. | .......................... | 2/455 |
| 5,534,330 A * | 7/1996 | Groshens | ....................... | 428/198 |
| 5,603,648 A * | 2/1997 | Kea | .................................. | 441/106 |
| 5,722,482 A * | 3/1998 | Buckley | ........................... | 165/10 |
| 5,860,163 A * | 1/1999 | Aldridge | .............................. | 2/81 |
| 5,893,991 A * | 4/1999 | Newell | ........................... | 219/211 |
| 5,970,519 A * | 10/1999 | Weber | ................................. | 2/81 |
| 5,977,517 A * | 11/1999 | Grosjean | ....................... | 219/211 |
| 6,004,662 A * | 12/1999 | Buckley | ...................... | 428/304.4 |
| 6,005,222 A * | 12/1999 | Hicks | ............................. | 219/211 |
| 6,018,819 A * | 2/2000 | King et al. | .......................... | 2/69 |
| 6,049,062 A * | 4/2000 | Jones | ............................. | 219/211 |
| 6,109,338 A * | 8/2000 | Butzer | ............................ | 165/46 |
| 6,120,530 A * | 9/2000 | Nuckols et al. | ................ | 607/108 |
| 6,209,144 B1 * | 4/2001 | Carter | ................................ | 2/458 |
| 6,313,438 B1 * | 11/2001 | Emerick, Jr. | .................. | 219/212 |
| 6,319,599 B1 * | 11/2001 | Buckley | ...................... | 428/308.4 |
| 6,397,401 B2 * | 6/2002 | Belcher | .............................. | 2/458 |
| 6,439,942 B1 * | 8/2002 | Pillai et al. | ...................... | 441/106 |
| 6,606,749 B2 * | 8/2003 | Underwood et al. | ............... | 2/93 |
| 6,649,873 B1 * | 11/2003 | Cintron et al. | ................. | 219/211 |
| 6,749,827 B2 * | 6/2004 | Smalley et al. | ............. | 423/447.3 |
| 6,855,410 B2 * | 2/2005 | Buckley | .................... | 428/311.11 |
| 6,947,285 B2 * | 9/2005 | Chen et al. | ....................... | 361/708 |
| 6,978,481 B2 * | 12/2005 | Mordecai et al. | ..................... | 2/81 |
| 6,979,709 B2 * | 12/2005 | Smalley et al. | ................ | 524/495 |
| 7,048,999 B2 * | 5/2006 | Smalley et al. | ................ | 428/367 |
| 7,067,096 B2 * | 6/2006 | Iijima et al. | ................. | 423/445 B |

(Continued)

*Primary Examiner* — Alissa L Hoey

(57) ABSTRACT

A detachable solar thermal coat assembly with carbon nanocapsule composite material includes an outer jacket, an inner lining and a conducting wire. The outer jacket has therein a power input device that provides electric power to a carbon nanocapsule fiber composite layer of the inner lining through the conducting wire so that the carbon nanocapsule fiber composite layer is powered to give out heat and warm a user wearing the solar thermal coat assembly.

5 Claims, 5 Drawing Sheets

U.S. PATENT DOCUMENTS

| | | |
|---|---|---|
| 7,107,629 B2 * | 9/2006 | Miros et al. ............... 2/458 |
| 7,891,019 B2 * | 2/2011 | Goldfine ..................... 2/69 |
| 8,084,722 B2 * | 12/2011 | Haas et al. ................ 219/543 |
| 2001/0021735 A1 * | 9/2001 | Schulz ........................ 524/155 |
| 2002/0090398 A1 * | 7/2002 | Dunn et al. ................ 424/486 |
| 2002/0127162 A1 * | 9/2002 | Smalley et al. ............ 422/198 |
| 2002/0136683 A1 * | 9/2002 | Smalley et al. ............ 423/461 |
| 2002/0146948 A1 * | 10/2002 | Pillai et al. ................ 441/106 |
| 2002/0150524 A1 * | 10/2002 | Smalley et al. ............ 422/198 |
| 2004/0126303 A1 * | 7/2004 | Hwang ...................... 423/447.2 |
| 2005/0143796 A1 * | 6/2005 | Augustine et al. ........ 607/104 |
| 2005/0249917 A1 * | 11/2005 | Trentacosta et al. ...... 428/137 |
| 2005/0274715 A1 * | 12/2005 | Johnson .................... 219/548 |
| 2006/0280906 A1 * | 12/2006 | Trentacosta et al. ...... 428/137 |
| 2006/0291193 A1 * | 12/2006 | Hill ........................... 362/108 |
| 2007/0043158 A1 * | 2/2007 | Smalley et al. ............ 524/495 |
| 2007/0048209 A1 * | 3/2007 | Smalley et al. ............ 423/447.1 |
| 2007/0151593 A1 * | 7/2007 | Jaynes ....................... 136/244 |
| 2007/0199333 A1 * | 8/2007 | Windisch .................. 62/3.5 |
| 2007/0207186 A1 * | 9/2007 | Scanlon et al. ............ 424/424 |
| 2008/0029153 A1 * | 2/2008 | Margalit .................... 136/252 |
| 2008/0063585 A1 * | 3/2008 | Smalley et al. ............ 423/414 |
| 2008/0063588 A1 * | 3/2008 | Smalley et al. ............ 423/447.1 |
| 2008/0089830 A1 * | 4/2008 | Smalley et al. ............ 423/461 |
| 2008/0107586 A1 * | 5/2008 | Smalley et al. ............ 423/447.3 |
| 2012/0028080 A1 * | 2/2012 | Truitt ......................... 429/7 |
| 2012/0074128 A1 * | 3/2012 | Blackford et al. ......... 219/487 |

* cited by examiner

DETACHABLE SOLAR THERMAL COAT ASSEMBLY WITH CARBON NANOCAPSULE COMPOSITE MATERIAL

BACKGROUND OF THE INVENTION

1. Technical Field

The present invention relates to solar thermal coats, and more particularly to a solar thermal coat assembly made of a carbon nanocapsule composite material that uses solar energy to provide warming effect.

2. Description of Related Art

The weather in high mountain areas is always changing, and thus, to mountain climbers in accidents, how to survive severe and changeable weather conditions by preventing body temperature from dropping is actually a matter of life and death. In the low latitude region, the incidence angle of sunshine is relatively large and the intensity of solar radiation is relatively high, so the weather there remains warm. On the contrary, in the high latitude region, the incidence angle of sunshine is relatively small and the weather there is generally cool because of dispersed solar energy. Particularly, in the Frigid Zone between 50 Degree North to 70 Degree North, including the north portions of Eurasia and North America, the mean maximum temperature is about 10° C., with a great temperature difference. Therefore, a great demand for light, comfortable and warm clothing exists among people in nations and areas of high latitudes. In addition, the significant temperature variation in the high latitude region is often unbearable to people resident in the low latitude region and traveling to there for either business or sightseeing. Besides, the aged people and special patients when receiving cold stimulus, are likely to have chills, slow breath, weak pulses and dull reaction, and in some worse cases, can even die for heart failure. The solar thermal life jacket disclosed in Taiwan Patent No. M338811 and the thermal cloth proposed by Taiwan Patent No. M356396 are both for warming users wearing them. However, the two prior inventions have the following problems to be improved:

1. The heating wires can only give sufficient heat when considerable electric power is consumed. Both the known devices use portable solar batteries built in the life jacket or thermal cloth, and the batteries probably fail to supply stuffiest electric power for the life jacket or thermal cloth to give heat for long time.

2. Since the heating wires are attached to the existing outer jacket of the life jacket or thermal cloth, the generated heat tends to convect with the relatively cool ambient air. Thus, the heat runs away too fast and more electric power is required for maintaining the temperature in the life jacket or thermal cloth. Consequently, the limited power stored in the solar battery can be exhausted very soon.

3. Since the heating wires are thick and heavy, the life jacket or thermal cloth having heating wires can add difficulty to users' action, thereby limiting the practicality of the product.

SUMMARY OF THE INVENTION

The present invention provides a solar thermal coat assembly made of a carbon nanocapsule composite material that comprises an outer jacket, an inner lining and a conducting wire. One objective of the present invention is to use a power input device in the outer jacket to power the inner lining so as to warm up the carbon nanocapsule composite fiber making up the inner lining, thereby keeping a user wearing the inner lining warm.

Another objective of the present invention is to provide a solar panel at an outer surface of the outer jacket so that the solar panel absorbs sunlight and converts it into electric power to be stored in an energy store device, thereby providing the electric power required by the inner lining for giving out heat and saving energy.

BRIEF DESCRIPTION OF THE DRAWINGS

The invention as well as a preferred mode of use, further objectives and advantages thereof will be best understood by reference to the following detailed description of an illustrative embodiment when acquire in conjunction with the accompanying drawings, wherein.

DETAILED DESCRIPTION OF THE INVENTION

Figure 1:
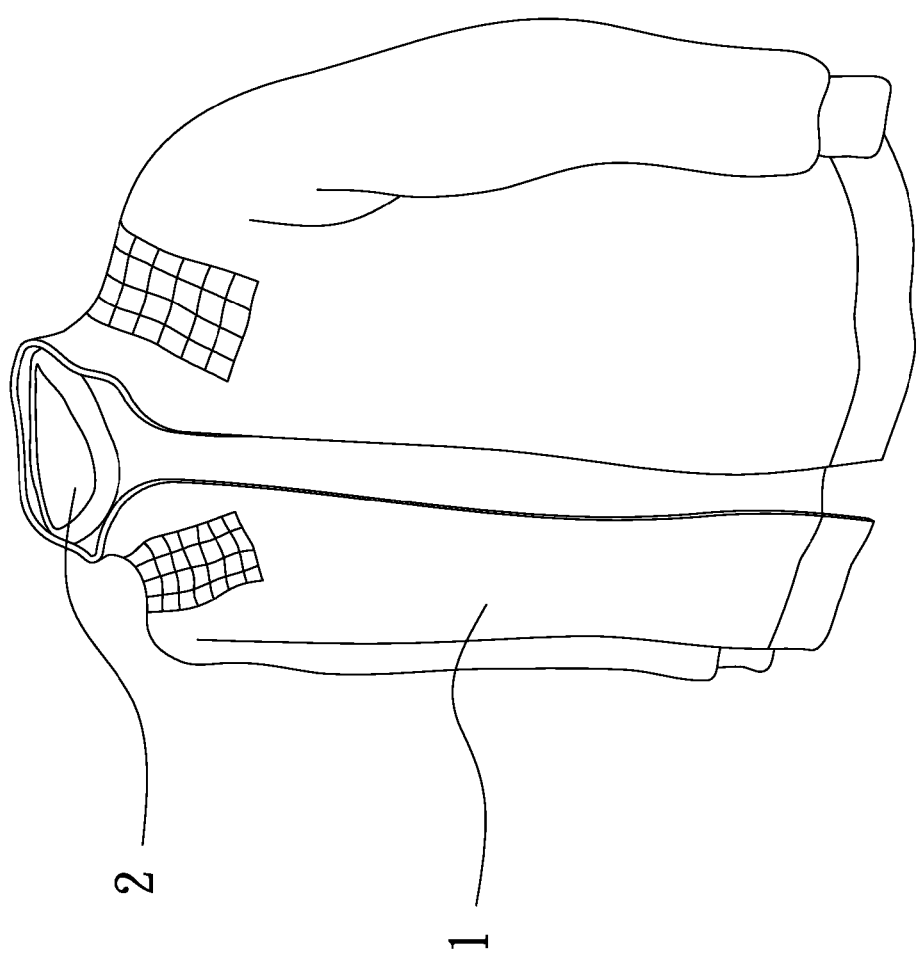
FIG. 1 is a perspective view of the present invention.
Figure 2:
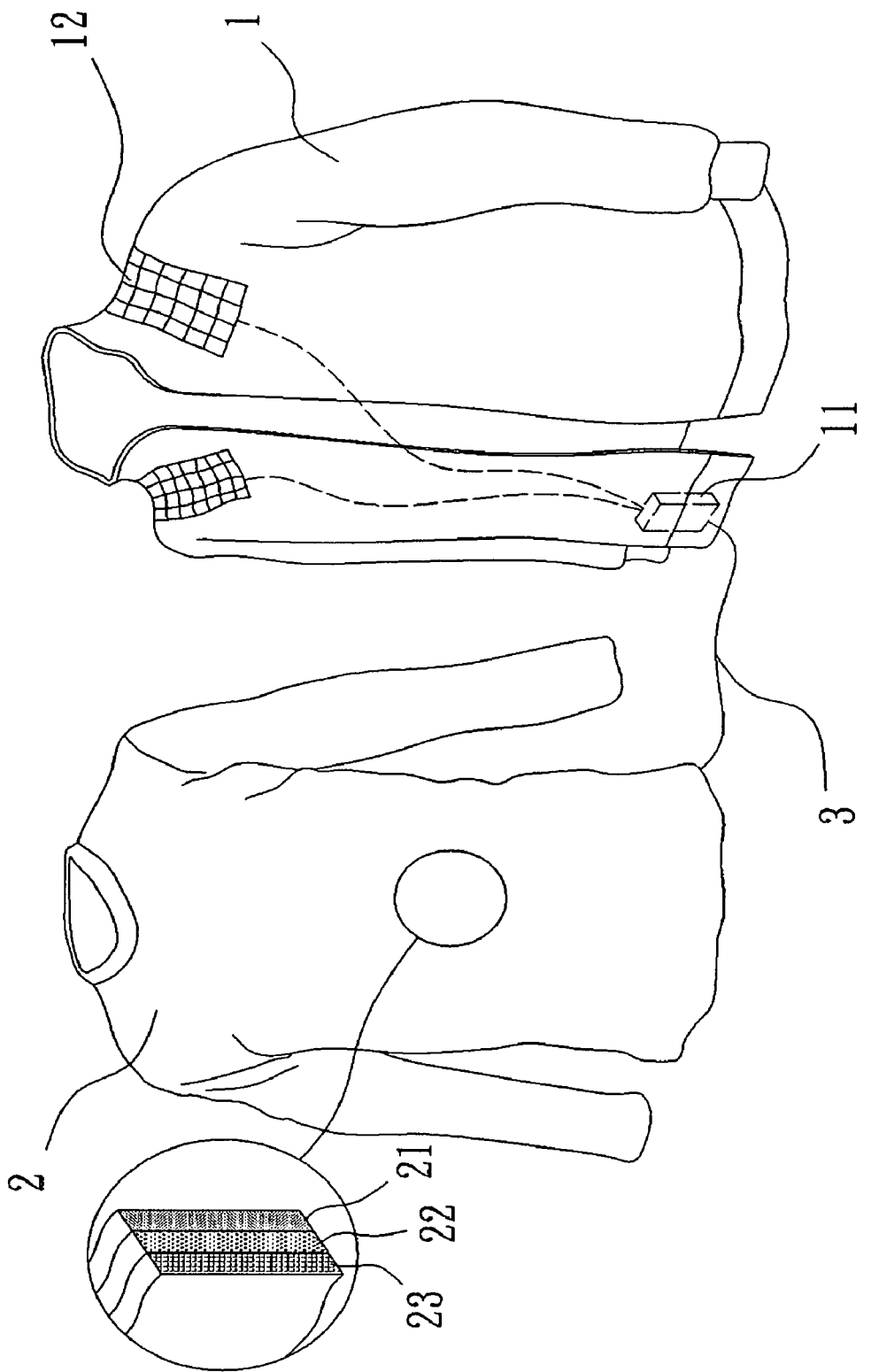
FIG. 2 is an exploded view of the present invention.
Figure 3:
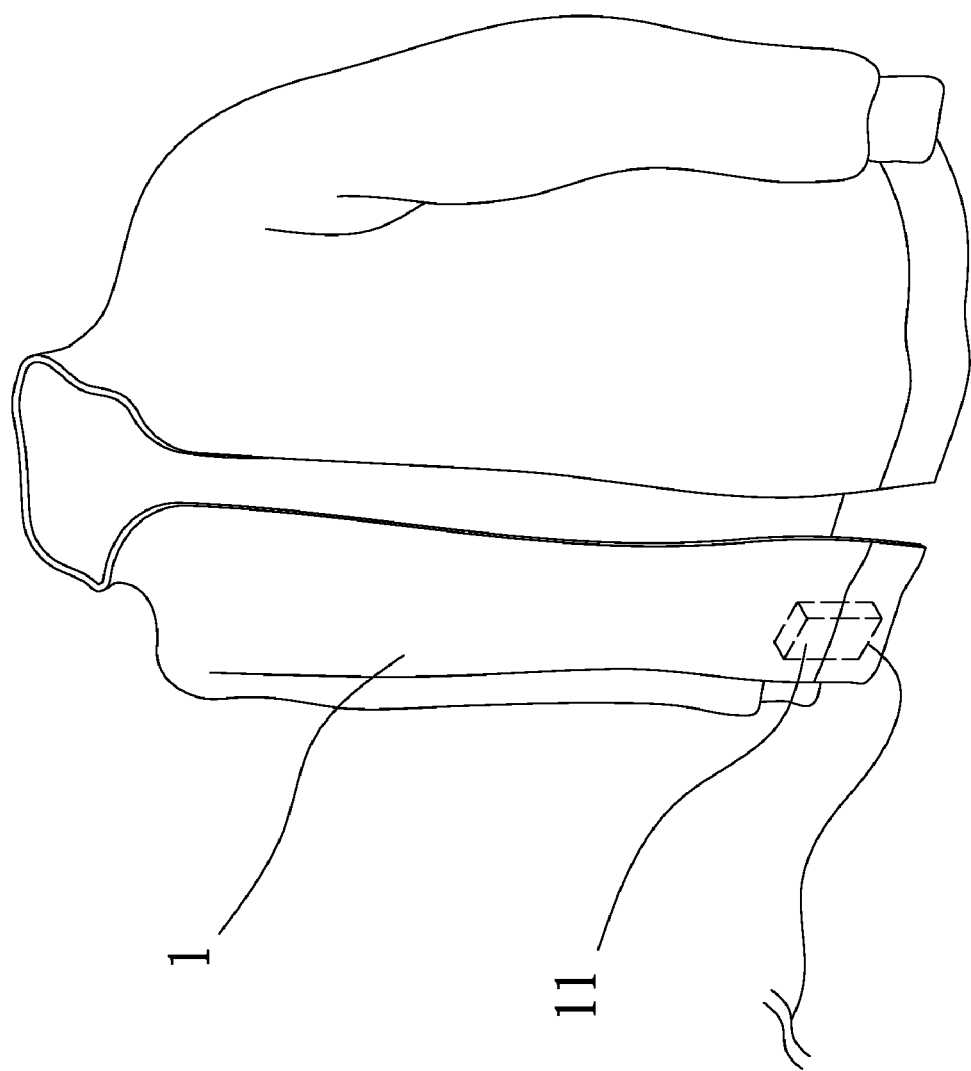
FIG. 3 and FIG. 4 are schematic partial drawings of the present invention.
Figure 4:
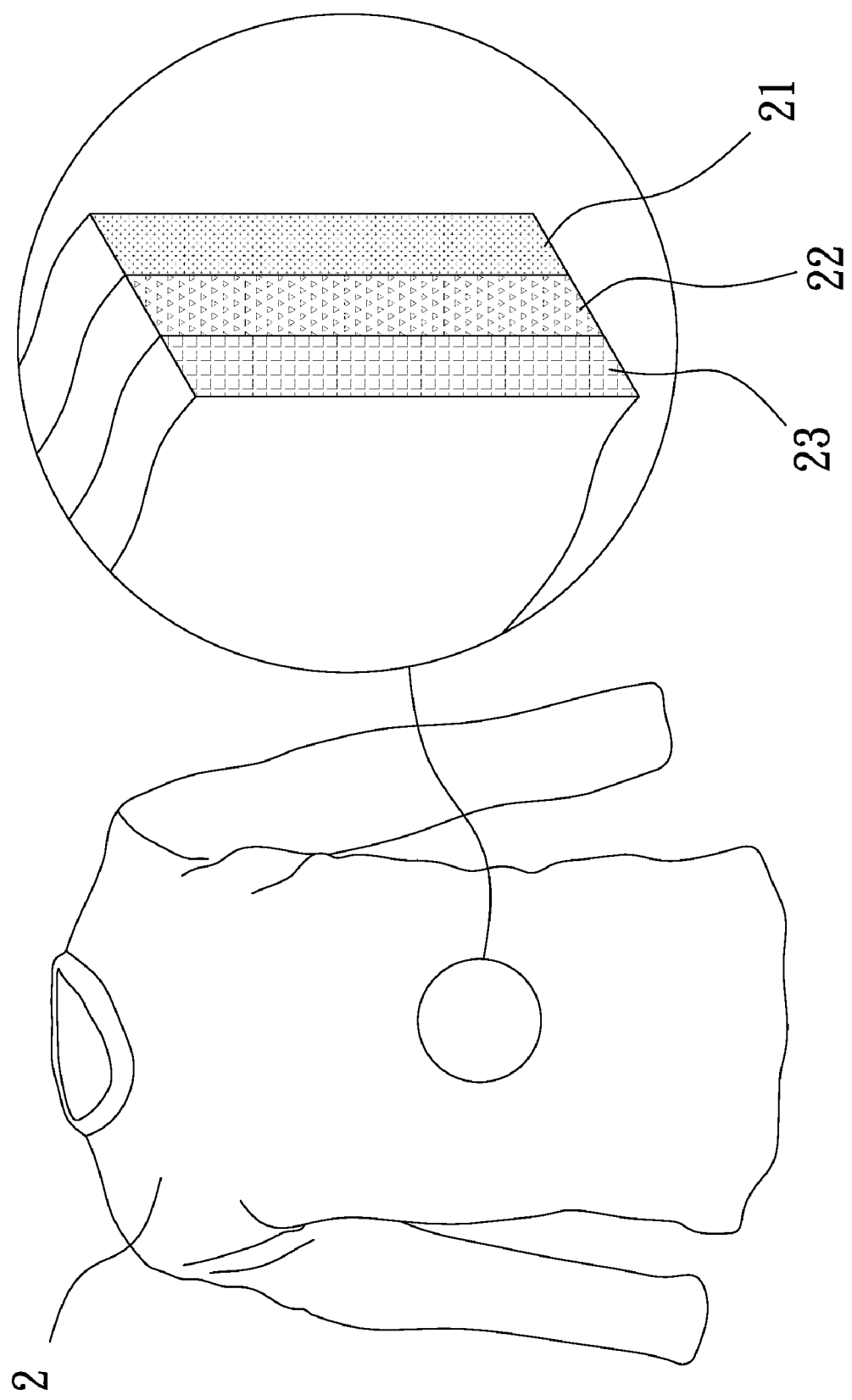
Figure 5:
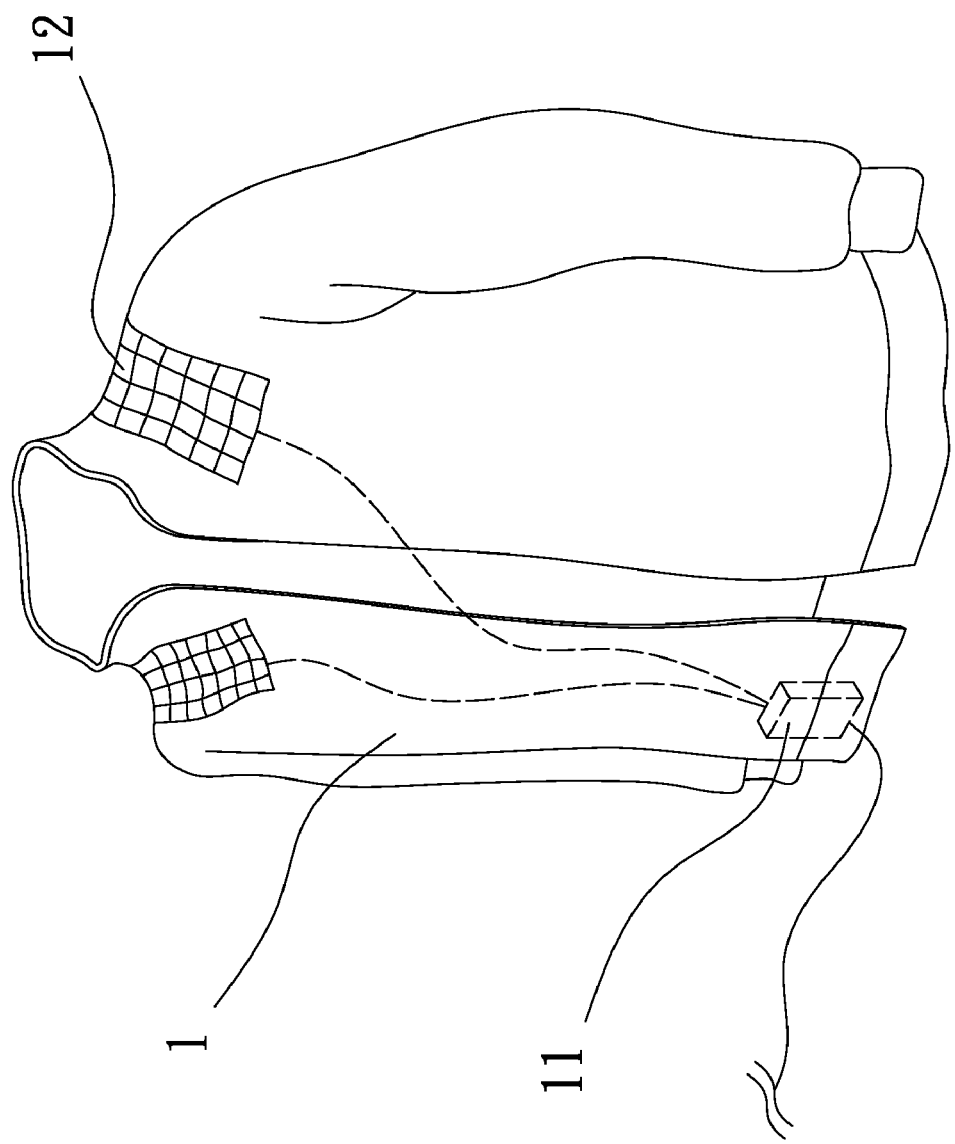
FIG. 5 is an applied view of the present invention.

Please refer to FIG. 1, FIG. 2, FIG. 3, FIG. 4 and FIG. 5 for a perspective view, an exploded view, schematic partial drawings and an applied view of the present invention wherein the present invention comprises an outer jacket 1, an inner lining 2 and a conducting wire 3. The outer jacket 1 is provided therein a power input device 11.

The inner lining 2 includes a contacting layer 21, a carbon nanocapsule fiber composite layer 22 and a heat insulation layer 23, wherein the carbon nanocapsule fiber composite layer 22 is made of carbon nanocapsule fiber composite that is mainly produced by blending carbon nanocapsules and a plastic material (polymer) under a high temperature, drawing and cooling fiber.

The conducting wire 3 serves to connect the power input device 11 of the outer jacket 1 and the inner lining 2.

In use, the outer jacket 1 and the inner lining 2 are to be worn by a user. The power input device 11 set in the outer jacket 1 transmits electric power to the carbon nanocapsule fiber composite layer 22 of the inner lining 2 through the conducting wire 3 so as to power the carbon nanocapsule fiber composite layer 22 to give out heat, thereby warming the user.

In addition, at least one flexible solar panel 12 may be provided at an outer surface of the outer jacket 1. The solar panel 12 absorbs sunlight and converts it into electric power. Then the conducting wire 3 can transmit the electric power to the carbon nanocapsule fiber composite layer 22 of the inner lining 2 so as to power the carbon nanocapsule fiber composite layer 22 to give out heat, thereby warming the user.

The present invention primarily implements the power input device 11 set in the outer jacket 1 to power the inner lining 2 to give out heat, and may additionally have at least one said solar panel 12 at an outer surface of the outer jacket 1. The solar panel 12 generates electric power by absorbing sunlight and provides the power required by the inner lining 2 to give out heat. Since the power input device 11 is capable of storing electric power, it can not only, when the solar thermal coat is worn by the user and the solar panel 12 is absorbing sunlight, directly supply power to the inner lining 2 to give out heat, but also, when the outer jacket 1 is not worn and placed in a place where the solar panel 12 is allowed to continuously absorb sunlight, store the converted electric power, so as to provide instant power supply when the solar thermal coat is worn.

Moreover, the carbon nanocapsule fiber composite layer 22 may be provided partially in the inner lining 2 or over the entire inner lining 2, so as to meet needs of different users and occasions.

Therein, a carbon nanocapsule is a polyhedral carbon cluster constituted by multiple graphite layers having a balls-within-a ball structure, with a capsule diameter of 10~50 nm (a few being more than 100 nm). In a carbon nanocapsule, the center of all the graphite layers is composed of hexagons, while the corners or turns have pentagons or heptagons, wherein each carbon atom is in the structure of sp2. Therefore, the special graphite structure enables the carbon nanocapsule fiber composite layer 22 to advantageously perform thermal transmission, electric conduction, high strength, chemical stability and excellent heat giving efficiency.

By the structure described above, the present invention, as compared with the conventional heating wires, creatively uses the carbon nanocapsule fiber composite layer 22 to give heat so as to save power consumption and reduce the overall weight of the solar thermal coat assembly. Hence, the present invention prolongs the battery life of the solar thermal coat while less burdening the user wearing the solar thermal coat assembly, thereby providing comfortable and convenient wearing experience to the user.

What is claimed is:

1. A detachable solar thermal coat assembly with carbon nanocapsule composite material, comprising:
    an outer jacket having a first sleeve, a second sleeve and a front panel with a front opening;
    a power input device capable of storing electric power located in the outer jacket;
    a separate inner lining garment having a first sleeve, a second sleeve and a closed front torso panel, the separate inner lining garment having a three layered construction comprising:
        a contacting layer,
        a carbon nanocapsule fiber composite layer, and
        a heat insulation layer;
    a conducting wire connecting the power input device on the outer jacket with the separate inner lining garment;
    wherein the power input device in the outer jacket transmits electric power to the carbon nanocapsule fiber composite layer of the inner lining through the conducting wire so as to power the carbon nanocapsule fiber composite layer to give out heat;
    wherein at least one solar panel is provided on an outer surface of the outer jacket, the solar panel is a flexible solar panel; and
    wherein when the solar thermal coat is worn by the user and the solar panel absorbs sunlight to directly supply power to the inner lining to give out heat, but also, when the outer jacket is not worn and placed in a place where the solar panel is allowed to continuously absorb sunlight, store the converted electric power, to provide instant power supply when the solar thermal coat is worn.

2. The detachable solar thermal coat assembly of claim 1, wherein the carbon nanocapsule fiber composite layer is sandwiched between the contacting layer and the heat insulation layer.

3. The detachable solar thermal coat assembly of claim 1, wherein the carbon nanocapsule fiber composite layer is provided partially or entirely between the contacting layer and the heat insulating layer.

4. The detachable solar thermal coat assembly of claim 1, wherein the carbon nanocapsule fiber composite layer is made by blending carbon nanocapsules and a plastic material under a high temperature, drawing the fiber and cooling the fiber.

5. The detachable solar thermal coat assembly of claim 1, wherein the carbon nanocapsule composite material contains carbon nanocapsules each being a polyhedral carbon cluster constituted by multiple graphite layers having a balls-within-ball structure.

* * * * *